(12) United States Patent
Sainis

(10) Patent No.: US 10,254,620 B1
(45) Date of Patent: Apr. 9, 2019

(54) ENCAPSULATED PHOTOELECTROPHORETIC DISPLAY

(71) Applicant: E Ink Corporation, Billerica, MA (US)

(72) Inventor: Sunil Krishna Sainis, Melrose, MA (US)

(73) Assignee: E Ink Corporation, Billerica, MA (US)

(*) Notice: Subject to any disclaimer, the term of this patent is extended or adjusted under 35 U.S.C. 154(b) by 0 days.

(21) Appl. No.: 15/447,933

(22) Filed: Mar. 2, 2017

Related U.S. Application Data

(60) Provisional application No. 62/305,154, filed on Mar. 8, 2016.

(51) Int. Cl.
*G02F 1/167* (2006.01)
*G02F 1/01* (2006.01)
(Continued)

(52) U.S. Cl.
CPC .............. *G02F 1/167* (2013.01); *G02F 1/01* (2013.01); *G02F 1/0126* (2013.01); *G03G 17/04* (2013.01); *G09G 3/344* (2013.01); *G02F 1/0018* (2013.01); *G02F 1/0063* (2013.01); *G02F 1/0541* (2013.01); *G02F 2001/1672* (2013.01);
(Continued)

(58) Field of Classification Search
CPC ........ G02F 1/00; G02F 1/0018; G02F 1/0063; G02F 1/01; G02F 1/0121; G02F 1/0126; G02F 1/01338; G02F 1/01716; G02F 1/03; G02F 1/0533; G02F 1/0541; G02F 1/1335; G02F 1/135; G02F 1/157; G02F 1/167; G02B 26/00; G03G 13/01; G03G 17/04; G03G 15/01; G03G 15/011; G03G 15/0409; G03G 15/14; G03G 15/22; G03G 15/24; G09G 3/34; G09G 3/344; G09G 3/3453

USPC ..... 359/242, 245, 296; 345/107; 430/32–34, 430/36–38, 43.1; 399/131, 177, 178, 399/206; 250/315.3, 336.1; 349/24, 25, 349/63

See application file for complete search history.

(56) References Cited

U.S. PATENT DOCUMENTS

| 2,940,847 A | 6/1960 | Kaprelian et al. |
| 3,383,993 A | 5/1968 | Yeh |

(Continued)

FOREIGN PATENT DOCUMENTS

WO 1999010767 3/1999

OTHER PUBLICATIONS

Wood, D., "An Electrochromic Renaissance?" Information Display, 18(3), 24 (Mar. 2002) Mar. 1, 2002.

(Continued)

*Primary Examiner* — Loha Ben
(74) *Attorney, Agent, or Firm* — Brian D. Bean

(57) ABSTRACT

The invention includes photoelectrophoretic displays and methods for creating reflective images using photoelectrophoretic displays. A photoelectrophoretic display typically includes a transparent electrode, an encapsulated photoelectrophoretic medium, and a rear electrode. An image is created by supplying an electrical potential between the electrodes that is insufficient to cause the photoelectrophoretic particles to move to the transparent electrode in the absence of incident light. In the presence of incident light, however, the photoelectrophoretic particles move to the viewing surface (transparent electrode), thereby producing an image.

12 Claims, 10 Drawing Sheets

(51) Int. Cl.
*G09G 3/34* (2006.01)
*G03G 17/04* (2006.01)
*G02F 1/1675* (2019.01)
*G02F 1/00* (2006.01)
*G02F 1/05* (2006.01)

(52) U.S. Cl.
CPC ....... *G02F 2001/1678* (2013.01); *G09G 3/34* (2013.01); *G09G 3/3453* (2013.01)

(56) References Cited

U.S. PATENT DOCUMENTS

| | | | |
|---|---|---|---|
| 3,384,488 A * | 5/1968 | Carreira | G01T 1/26 252/501.1 |
| 3,384,565 A * | 5/1968 | Carreira | G01T 1/26 399/131 |
| 3,535,221 A * | 10/1970 | Tulagin | G03G 15/14 399/131 |
| 3,610,748 A * | 10/1971 | Mannik | G03G 17/04 399/131 |
| 3,630,884 A * | 12/1971 | Gundlach | G03G 17/04 250/315.3 |
| 3,667,842 A * | 6/1972 | Wharton | G03G 15/011 399/131 |
| 3,689,400 A * | 9/1972 | Ota et al. | G02F 1/167 250/315.3 |
| 3,719,484 A | 3/1973 | Egnaczak | |
| 3,748,035 A * | 7/1973 | Mannik | G03G 13/01 335/32 |
| 3,772,013 A * | 11/1973 | Wells | G03G 17/04 430/34 |
| 4,078,928 A | 3/1978 | Keller | |
| 4,418,346 A | 11/1983 | Batchelder | |
| 5,760,761 A | 6/1998 | Sheridon | |
| 5,777,782 A | 7/1998 | Sheridon | |
| 5,808,783 A | 9/1998 | Crowley | |
| 5,872,552 A | 2/1999 | Gordon, II | |
| 6,017,584 A | 1/2000 | Albert | |
| 6,054,071 A | 4/2000 | Mikkelsen, Jr. | |
| 6,055,091 A | 4/2000 | Sheridon | |
| 6,067,185 A | 5/2000 | Albert | |
| 6,097,531 A | 8/2000 | Sheridon | |
| 6,128,124 A | 10/2000 | Silverman | |
| 6,130,774 A | 10/2000 | Albert | |
| 6,137,467 A | 10/2000 | Sheridon | |
| 6,144,361 A | 11/2000 | Gordon, II | |
| 6,147,791 A | 11/2000 | Sheridon | |
| 6,172,798 B1 | 1/2001 | Albert | |
| 6,184,856 B1 | 2/2001 | Gordon, II | |
| 6,225,971 B1 | 5/2001 | Gordon, II | |
| 6,241,921 B1 | 6/2001 | Jacobson | |
| 6,271,823 B1 | 8/2001 | Gordon, II | |
| 6,301,038 B1 | 10/2001 | Fitzmaurice | |
| 6,538,801 B2 * | 3/2003 | Jacobson | B41J 2/01 345/107 |
| 6,664,944 B1 | 12/2003 | Albert | |
| 6,672,921 B1 | 1/2004 | Liang | |
| 6,693,620 B1 | 2/2004 | Herb | |
| 6,704,133 B2 | 3/2004 | Gates | |
| 6,721,083 B2 * | 4/2004 | Jacobson | B41J 2/01 106/31.16 |
| 6,788,449 B2 | 9/2004 | Liang | |
| 6,822,782 B2 | 11/2004 | Honeyman | |
| 6,864,875 B2 | 3/2005 | Drzaic | |
| 6,866,760 B2 | 3/2005 | Paolini, Jr. | |
| 6,870,657 B1 | 3/2005 | Fitzmaurice | |
| 6,922,276 B2 | 7/2005 | Zhang et al. | |
| 6,930,668 B2 | 8/2005 | Noolandi et al. | |
| 6,950,220 B2 | 9/2005 | Abramson et al. | |
| 6,982,178 B2 | 1/2006 | LeCain et al. | |
| 7,002,728 B2 | 2/2006 | Pullen et al. | |
| 7,012,600 B2 | 3/2006 | Zehner | |
| 7,075,502 B1 | 7/2006 | Drzaic | |
| 7,116,318 B2 | 10/2006 | Amundson et al. | |
| 7,167,155 B1 | 1/2007 | Albert et al. | |
| 7,170,670 B2 | 1/2007 | Webber | |
| 7,236,291 B2 | 6/2007 | Kaga et al. | |
| 7,312,784 B2 | 12/2007 | Baucom et al. | |
| 7,321,459 B2 | 1/2008 | Masuda et al. | |
| 7,339,715 B2 | 3/2008 | Webber et al. | |
| 7,411,719 B2 | 8/2008 | Paolini, Jr. et al. | |
| 7,420,549 B2 | 9/2008 | Jacobson | |
| 7,453,445 B2 | 11/2008 | Amundson | |
| 7,535,624 B2 | 5/2009 | Amundson et al. | |
| 7,561,324 B2 | 7/2009 | Duthaler et al. | |
| 7,667,684 B2 | 2/2010 | Jacobson et al. | |
| 7,679,814 B2 | 3/2010 | Paolini, Jr. et al. | |
| 7,791,789 B2 | 9/2010 | Albert | |
| 7,839,564 B2 | 11/2010 | Whitesides et al. | |
| 7,910,175 B2 | 3/2011 | Webber | |
| 7,952,790 B2 | 5/2011 | Honeyman | |
| 7,956,841 B2 | 6/2011 | Albert | |
| 8,009,348 B2 | 8/2011 | Zehner | |
| 8,040,594 B2 | 10/2011 | Paolini, Jr. | |
| 8,054,526 B2 | 11/2011 | Bouchard | |
| 8,098,418 B2 | 1/2012 | Paolini, Jr. | |
| 8,213,076 B2 | 7/2012 | Albert | |
| 8,270,064 B2 | 9/2012 | Feick | |
| 8,319,759 B2 | 11/2012 | Jacobson | |
| 8,363,299 B2 | 1/2013 | Paolini, Jr. | |
| 8,441,714 B2 | 5/2013 | Paolini, Jr. | |
| 8,441,716 B2 | 5/2013 | Paolini, Jr. | |
| 8,466,852 B2 | 6/2013 | Drzaic | |
| 8,576,470 B2 | 11/2013 | Paolini, Jr. | |
| 8,576,476 B2 | 11/2013 | Telfer, Jr. | |
| 8,593,721 B2 | 11/2013 | Albert | |
| 8,797,634 B2 | 8/2014 | Paolini, Jr. | |
| 8,830,559 B2 | 9/2014 | Honeyman et al. | |
| 8,873,129 B2 | 10/2014 | Paolini, Jr. | |
| 8,902,153 B2 | 12/2014 | Bouchard | |
| 9,170,467 B2 | 10/2015 | Whitesides | |
| 9,199,441 B2 | 12/2015 | Danner | |
| 9,293,511 B2 | 3/2016 | Jacobson | |
| 2008/0043318 A1 | 2/2008 | Whitesides | |
| 2008/0048970 A1 | 2/2008 | Drzaic | |
| 2009/0225398 A1 | 9/2009 | Duthaler | |
| 2010/0156780 A1 | 6/2010 | Jacobson | |
| 2012/0293858 A1 | 11/2012 | Telfer | |
| 2012/0326957 A1 | 12/2012 | Drzaic | |

OTHER PUBLICATIONS

O'Regan, B. et al., "A Low Cost, High-efficiency Solar Cell Based on Dye-sensitized colloidal TiO2 Films", Nature, vol. 353, Oct. 24, 1991, 737-740 Oct. 24, 1991.

Bach, U. et al., "Nanomaterials-Based Electrochromics for Paper-Quality Displays", Adv. Mater, 14(11), 845 (2002) Jun. 5, 2002.

Hayes, R.A. et al., "Video-Speed Electronic Paper Based on Electrowetting", Nature, vol. 425, Sep. 25, pp. 383-385 (2003) Sep. 25, 2003.

Kitamura, T. et al., "Electrical toner movement for electronic paper-like display", Asia Display/IDW '01, p. 1517, Paper HCS1-1 (2001) Jan. 1, 2001.

Yamaguchi, Y. et al., "Toner display using insulative particles charged triboelectrically", Asia Display/IDW '01, p. 1729, Paper AMD4-4 (2001) Jan. 1, 2001.

Moilanen, David E., Fenn, Emily E., Wong, Daryl, and Fayer, Michael D., Water dynamics in large and small reverse micelles: From two ensembles to collective behavior, J. Chem. Phys., 131, 14704 (2009) Dec. 31, 2009.

Vsevolod, Tulagin, "Imaging Method Based on Photoelectrophoresis", Journal of the Optical Society of America, vol. 59, No. 3, p. 328 (Mar. 1969). Mar. 1, 1969.

* cited by examiner

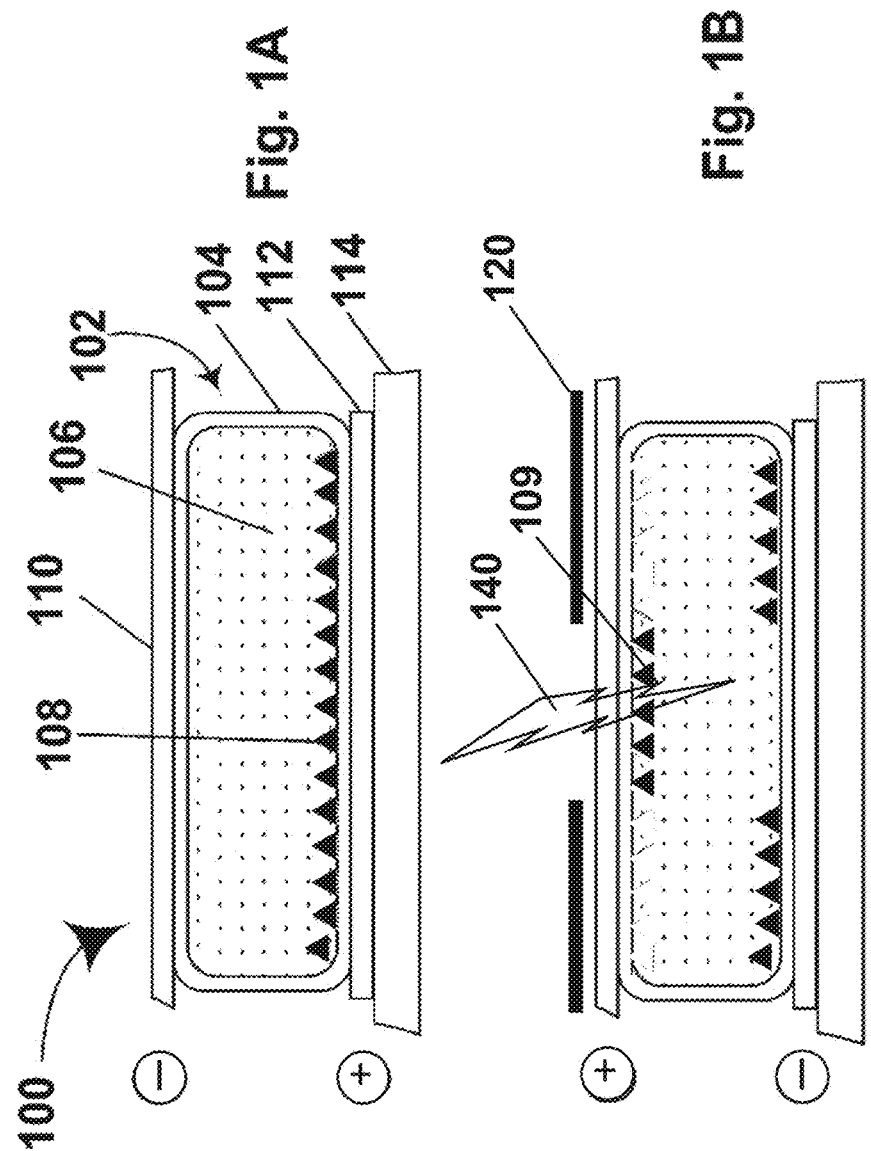

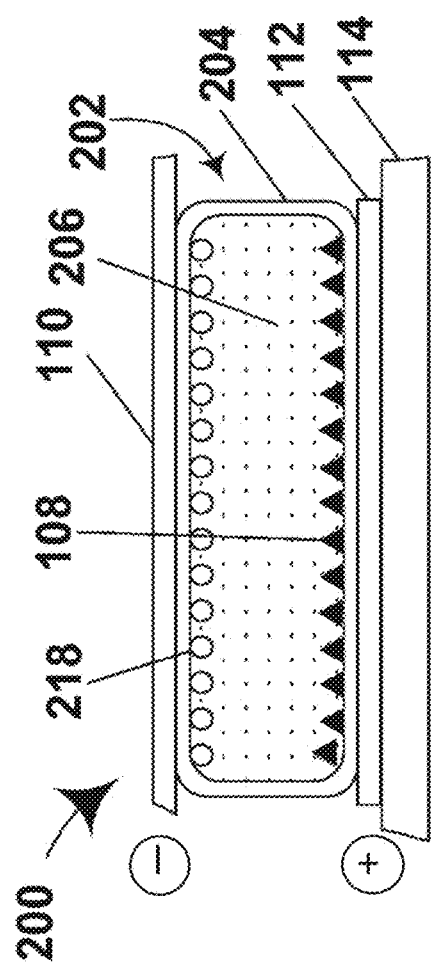
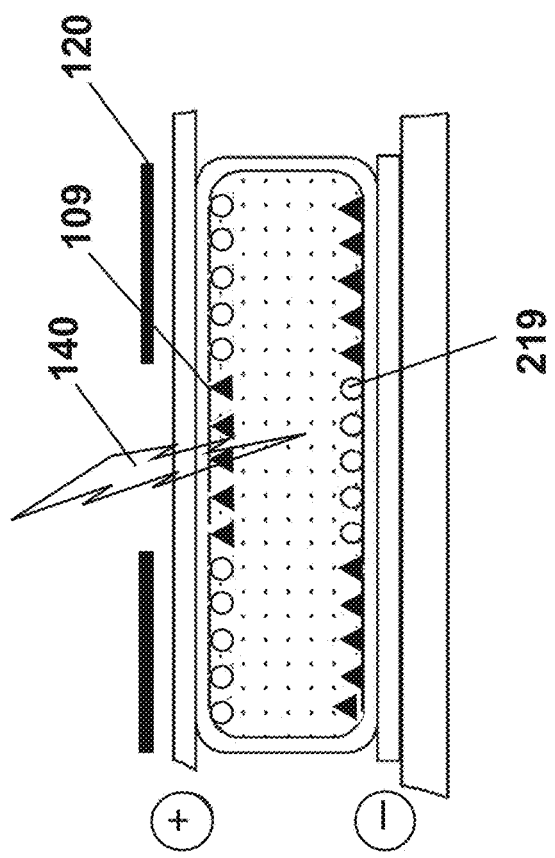

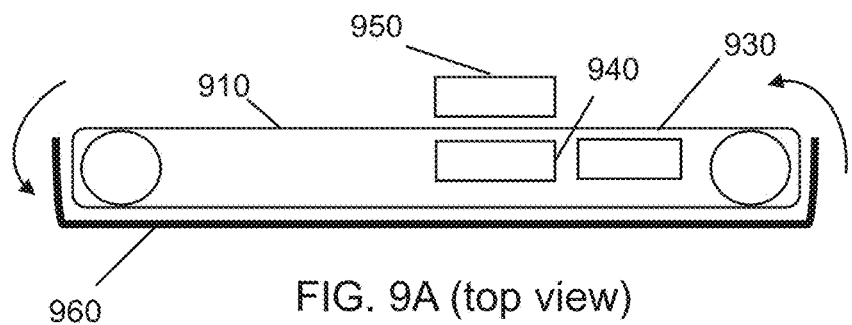
FIG. 9A (top view)
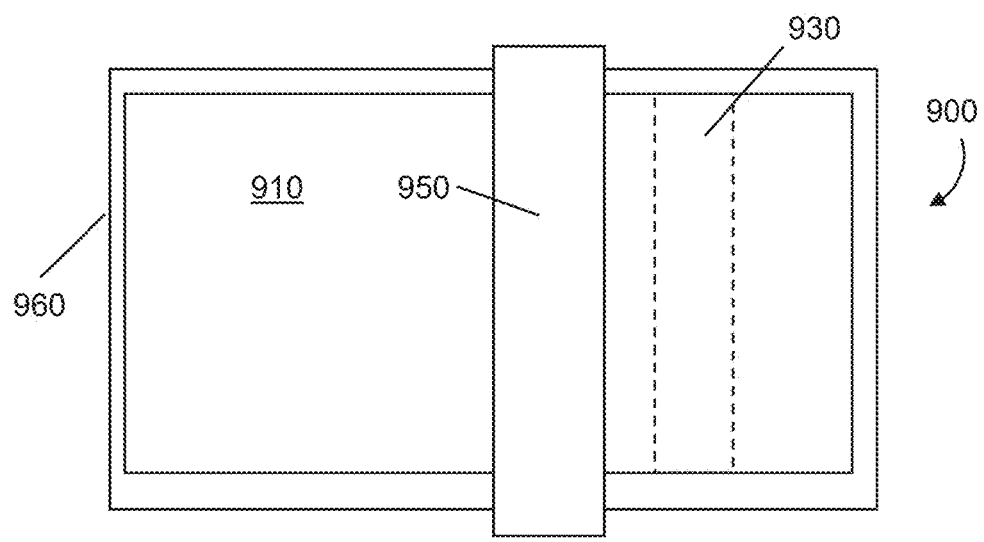
FIG. 9B (back view)
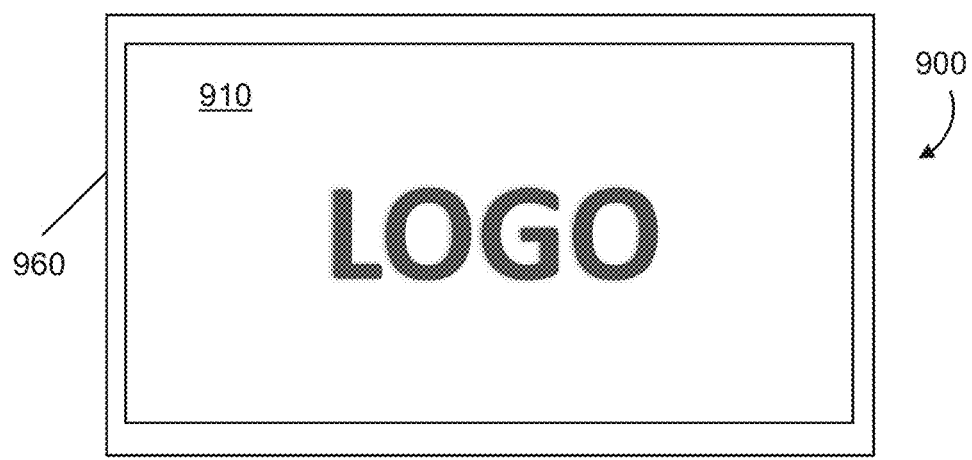
FIG. 9C (front view)

ENCAPSULATED PHOTOELECTROPHORETIC DISPLAY

RELATED APPLICATIONS

This application claims priority to U.S. Provisional Application No. 62/305,154, filed Mar. 8, 2016. This application is also related to U.S. patent application Ser. No. 14/849,658, filed Sep. 10, 2015 (published as U.S. Patent Publication No. 2016/0085132), now U.S. Pat. No. 9,921,451. All of the listed applications are incorporated by reference in their entireties.

SUBJECT OF THE INVENTION

This invention relates to reflective electro-optic displays and materials for use in such displays. More specifically, this invention relates to displays incorporating encapsulated photoelectrophoretic materials. When an electric field of sufficient strength is applied to the photoelectrophoretic medium, a display can be "written" with an illumination source, e.g., a patterned light source. In effect, the light causes portions of the photoelectrophoretic medium to experience a change electrophoretic mobility, thereby allowing only that portion of the medium exposed to the light to switch states. Alternatively, instead of a patterned light source, a mask can be placed in front of the display and the entire display (including the mask) can be illuminated, causing the unmasked areas to switch color. The display will retain the image for long periods of time with minimal or no additional energy input, and may be subsequently re-written, as needed. Thus, the invention provides a lightweight, low-cost display that can be reused. In some embodiments, the display is flexible.

BACKGROUND

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a display or drive scheme which only drives pixels to their two extreme optical states with no intervening gray states.

The term "pixel" is used herein in its conventional meaning in the display art to mean the smallest unit of a display capable of generating all the colors which the display itself can show. In a full color display, typically each pixel is composed of a plurality of sub-pixels each of which can display less than all the colors which the display itself can show. For example, in most conventional full color displays, each pixel is composed of a red sub-pixel, a green sub-pixel, a blue sub-pixel, and optionally a white sub-pixel, with each of the sub-pixels being capable of displaying a range of colors from black to the brightest version of its specified color.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", *IDW Japan,* 2001, Paper HCS1-1, and Yamaguchi, Y., et al., "Toner display using insulative particles charged triboelectrically", *IDW Japan,* 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 6,017,584; 6,664,944; 6,864,875; 7,075,502; 7,167,155; 7,667,684; 7,791,789; 7,956,841; 8,040,594; 8,054,526; 8,098,418; 8,213,076; and 8,363,299; and U.S. Patent Applications Publication Nos. 2004/0263947; 2007/0109219; 2007/0223079; 2008/0023332; 2008/0043318; 2008/0048970; 2009/0004442; 2009/0225398; 2010/0103502; 2010/0156780; 2011/0164307; 2011/0195629; 2011/0310461; 2012/0008188; 2012/0019898; 2012/0075687; 2012/0081779; 2012/0134009; 2012/0182597; 2012/0212462; 2012/0157269; and 2012/0326957; (f) Methods for driving displays; see for example U.S. Pat. Nos. 7,012,600 and 7,453,445;

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed, using a variety of methods, the display itself can be made inexpensively.

Other types of electro-optic materials may also be used in the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

In yet another embodiment, such as described in U.S. Pat. No. 6,704,133, electrophoretic displays may be constructed with two continuous electrodes and an electrophoretic layer and a photoelectrophoretic layer between the electrodes. Because the photoelectrophoretic material changes resistivity with the absorption of photons, incident light can be used to alter the state of the electrophoretic medium. Such a device is illustrated in FIG. 1. As described in U.S. Pat. No. 6,704,133, the device of FIG. 1 works best when driven by an emissive source, such as an LCD display, located on the opposed side of the display from the viewing surface. In some embodiments, the devices of U.S. Pat. No. 6,704,133 incorporated special barrier layers between the front electrode and the photoelectrophoretic material to reduce "dark currents" caused by incident light from the front of the display that leaks past the reflective electro-optic media.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet.

FIG. 1 of U.S. Pat. No. 6,982,178 is reproduced herein as FIG. 10. FIG. 10 is a schematic cross-section through a basic front plane laminate of the present invention showing the manner in which the release sheet is peeled from the laminate prior to incorporation of the laminate into a display. As shown in FIG. 10, the laminate (generally designated 10) comprises a light transmissive substrate 12, which has the form of a transparent plastic film, conveniently a 7 mil (177 {circumflex over (1)}¼m) PET sheet. Although not shown in FIG. 10, the substrate 12, the lower surface of which (as illustrated in FIG. 10) forms the viewing surface of the final display, may have one or more additional layers, for example a protective layer to absorb ultra-violet radiation, barrier layers to prevent ingress of oxygen or moisture into the final display, and anti-reflection coatings to improve the optical properties of the final display. The substrate 12 carries a thin light-transmissive electrically-conductive layer 14, preferably of ITO, which acts as the front electrode in the final display.

A layer (generally designated 16) of an electro-optic medium is deposited upon, and in electrical contact with, the conductive layer 14. The electro-optic medium shown in FIG. 10 is an opposite charge dual particle encapsulated electrophoretic medium of the type described in the aforementioned 2002/0185378, and comprises a plurality of microcapsules, each of which comprises a capsule wall 18 containing a hydrocarbon-based liquid 20 in which are suspended negatively charged white particles 22 and positively charged black particles 24. The microcapsules are retained within a binder 25. Upon application of an electrical field across the layer 16, the white particles 22 move to the positive electrode and the black particles 24 move to the negative electrode, so that the layer 16 appears, to an observer viewing the display through the substrate 12, white or black depending upon whether the layer 14 is positive or negative relative to the backplane at any point within the final display.

The laminate 10 further comprises a layer 26 of lamination adhesive coated over the electro-optic medium layer 16 and a release layer 28 covering the adhesive layer 26. The release layer is conveniently a 7 mil (177 {circumflex over (1)}¼m) PET film, which may be provided with any appropriate release coating, for example a silicone coating. As illustrated at the left side of FIG. 10, the release layer 28 is peeled from the adhesive layer 26 before the laminate is laminated, by means of the adhesive layer 26, to a backplane to form the final display.

Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The photoelectrophoretic properties of certain pigments were recognized some time ago. For example U.S. Pat. No. 3,383,993 discloses a photoelectrophoretic imaging apparatus that could be used to reproduce projected images on a medium, typically a transparent electrode, such as ITO. The photoelectrophoretic process described in the '993 patent, and other related patents by Xerox Corporation, was not reversible, however, because the photoelectrophoretic process involved the photoelectrophoretic particles migrating to an "injecting electrode" where they would become attached to the electrode. Because of the lack of reversibility, as well as the cost and complication of the setup, this phenomenon was not commercialized widely.

SUMMARY OF INVENTION

The invention provides a reflective display that can be addressed from the front (viewing surface side) of the display with a light source, such as sunlight, an incandescent filament, fluorescent light, LED, or laser. The display comprises (in order) a transparent electrode, an encapsulated photoelectrophoretic medium, and a rear electrode. In most embodiments, the rear electrode is a continuous layer of conductive material. In many embodiments the invention does not require a rear electrode having individually-addressable pixels, greatly reducing the cost of fabrication. (However, it is possible to create embodiments in which the rear electrode is an active matrix of transistors.) When the electrodes are biased favorably, incident light from a light source will alter the electrophoretic mobility of the photoelectrophoretic particles, thereby allowing the state of the photoelectrophoretic material to be altered by the electric field. Thus, the photoelectrophoretic medium will change states where it has been exposed to light. For example, exposure to light may cause the photoelectrophoretic medium to change from a red to a white state. Accordingly, an image projected onto the display will be reproduced by the display. The image will remain on the display until a later time when the image is cleared or reset.

The invention additionally provides a method of displaying a reflective image. The method includes providing a photoelectrophoretic display of the invention (i.e., comprising (in order) a transparent electrode, an encapsulated photoelectrophoretic medium, and a rear electrode), supplying an electrical potential between the electrodes of the display, and exposing the display to an illumination source. The illumination source can be any suitably bright source, such as sunlight, an incandescent filament, a fluorescent light, a laser, or a light-emitting diode (LED). Once an image of the patterned light has been captured by the display, the electrical potential can be removed, i.e., by breaking a circuit, whereupon the potential difference between the electrodes will not be great enough to drive a state transition in the photoelectrophoretic medium. Because the photoelectrophoretic medium is bistable, the display will retain the image even in the presence of additional incident light. Thus, the display can be the foundation for a reusable billboard or poster that is in direct sunlight, a location that is often unfavorable for conventional electro-optic displays, e.g., LCD displays.

In some embodiments, the displays of the invention are used in a display system for reflective images. Such display systems comprise a display of the invention (i.e., comprising (in order) a transparent electrode, an encapsulated photoelectrophoretic medium, and a rear electrode), a voltage supply (power supply) for providing the voltages to the electrodes to allow the photoelectrophoretic medium to change states, and an illumination source configured to illuminate a portion of the display with light to address the display. In some embodiments, the system comprises a controller to regulate the voltage delivered to the electrodes. In some embodiments, the controller will provide specific time-dependent voltage waveforms to the electrodes to allow the display to be cleared ("wiped") or to retain an image created with the illumination source ("write"). With the use of carefully-selected pigments, it is possible to create a system that can be written with invisible light (e.g., ultraviolet or infrared). Such a system may be addressed simultaneously while it is being viewed.

BRIEF DESCRIPTION OF DRAWINGS

FIG. 1A is a schematic cross-sections through a first electrophoretic display of the invention in which the electrophoretic medium comprises a single type of photoelectrophoretic particle in a colored suspending fluid.

FIG. 1B is a schematic cross-sections through a first electrophoretic display of the invention in which the electrophoretic medium comprises a single type of photoelectrophoretic particle in a colored suspending fluid.

FIG. 2A is a schematic cross-section, generally similar to that of FIG. 1A, through a second electrophoretic display of the invention in which the electrophoretic medium comprises two different types of photoelectrophoretic particles, bearing charges of opposite polarity, in an uncolored suspending fluid.

FIG. 2B is a schematic cross-section, generally similar to that of FIG. 1B, through a second electrophoretic display of the invention in which the electrophoretic medium comprises two different types of photoelectrophoretic particles, bearing charges of opposite polarity, in an uncolored suspending fluid.

FIG. 9A is a top view of an embodiment of a billboard incorporating a display medium of the invention without a rear electrode and an array of light sources to write an image onto the display medium which is moved past the array.

FIG. 9B is a back view of an embodiment of a billboard incorporating a display medium of the invention.

FIG. 9C is a front view of an embodiment of a billboard incorporating a display medium of the invention.

FIG. 10 shows an encapsulated electrophoretic medium comprising a plurality of microcapsules held with a polymeric binder.

DETAILED DESCRIPTION

Figure 3A:
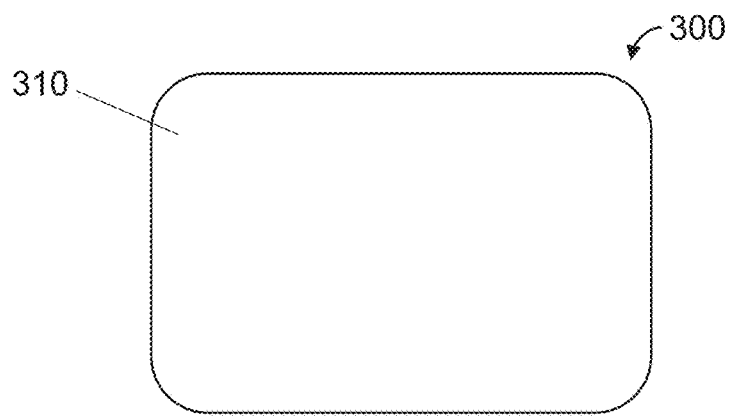
FIG. 3A shows an encapsulated photoelectrophoretic display prior to writing.

As indicated above, the present invention provides a reusable encapsulated photoelectrophoretic display. The display 100 can be incorporated into inexpensive devices that can be rewritten as needed, such as tablets, posters, or billboards. Because the encapsulated electrophoretic medium is reflective, it is particularly well-suited for high-background lighting environments, such as outdoor advertising. When used in such environments, the disclosed displays are also more energy efficient than state-of-the-art reusable displays because the displays only require small amounts of energy for refreshing the content, after which they operate substantially without additional energy.

An encapsulated photoelectrophoretic display of the invention is shown in FIGS. 1A and 1B. The display comprises an encapsulated photoelectrophoretic medium, which is a reflective medium, (generally designated 102) comprising a plurality of capsules 104 (only one of which is shown in FIGS. 1A and 1B), each of which contains a suspending liquid 106 and dispersed therein a plurality of a single type of photosensitive particle 108, which for purposes of illustration the particles 108 will be assumed to be magenta (thus reflective). The particles 108 are electrophoretically mobile and may be formed of Ink Jet Magenta E 02 VP2621, available from Clariant, Basel, Switzerland. In the following description, it will be assumed that the particles 108 are negatively charged, although of course positively charged particles could also be used if desired. (The triangular shape of the particles 108, and the circular shapes of other particles discussed below, are used purely to way of illustration to enable the various types of particles to be distinguished easily in the accompanying drawings, and in no way correspond to the physical forms of the actual particles, which are typically substantially spherical. However, using non-spherical particles in the displays is not excluded.) The display 100 further comprises a common, transparent front electrode 110, which forms a viewing surface through which an observer views the display 100. The rear electrode 112 may be a single rear electrode, or the display 100 may include a plurality of discrete rear electrodes 112, each of which defines one pixel of the display 100 (in such a case, only one rear electrode 112 is shown in FIGS. 1A and 1B). For ease of illustration and comprehension, FIGS. 1A and 1B show only a single microcapsule forming the pixel defined by rear electrode 112, although in practice a large number (20 or more) microcapsules are normally used for each pixel. The rear electrodes 112 are mounted upon a substrate 114.

In some embodiments, the suspending liquid 106 is colored such that the particles 108 lying in the positions shown in FIG. 1A adjacent the rear electrodes 112 are not visible to an observer viewing the display 100 via the front electrode 110. However, in other embodiments the suspending liquid 106 is transparent or translucent. The necessary color in the suspending liquid 106 may be provided by dissolving a dye in the liquid. In some embodiments, the colored suspending liquid 106 and the particles 108 render the electrophoretic medium 102 opaque, thus the rear electrodes 112 and the substrate 114 can be transparent or opaque because they are not visible through the opaque electrophoretic medium 102.

The capsules 104 and the particles 108 can be made in a wide range of sizes. However, in general it is preferred that the thickness of the capsules, measured perpendicular to the electrodes, be in the range of about 15 to 500 µm, while the particles 108 will typically have diameters in the range of about 0.25 to about 2 µm.

FIG. 1A shows the display 100 with the rear electrode 112 positively charged and the front electrode 110 negatively charged. Under this condition, the negatively-charged particles 108 are attracted to the positive rear electrode 112 and thus lie adjacent the rear electrode 112. Accordingly, the pixel shown in FIG. 1A displays to the observer the color of the liquid 106, which for purposes of illustration will be assumed to be white.

FIG. 1B shows the display 100 with the front electrode 110 made positive relative to the rear electrode 112. FIG. 1B additionally includes a mask 120 that protects a portion of the display 100 from light 140 from an illumination source. However, the magnitude of the electrical potential in FIG. 1B is smaller than the magnitude of the electrical potential in FIG. 1A. Because this second electrical potential is insufficient to cause the particles 108 to move substantially away from the rear electrode 112, the majority of the particles 108 stay at the bottom of the capsule 104. However, the portion of the particles 109 that are exposed to the light 140 undergo a photoreaction resulting in an increased electrophoretic mobility. As shown in FIG. 1B, the increased electrophoretic mobility results in the portion of particles 109 moving to the top electrode in the presence of a decrease electrical potential. As a result, once the electrical potential and the mask 120 are removed from the display 100, a stable pattern of the magenta particles 108 will be visible where the portion of particles 109 was exposed to the light 140. See FIGS. 3A-3C.

The smaller electrical potential in FIG. 1B can be achieved by applying smaller voltages than in FIG. 1A to electrodes 110 and 112 for the same time. Alternatively, the smaller electrical potential in FIG. 1B can be achieved by applying the same voltages as in FIG. 1A to electrodes 110 and 112, but for a shorter period of time. (Of course, other intermediate combinations of time and voltage can achieve the same effect.)

In FIGS. 1A and 1B, the capsules 104 are illustrated as being of substantially prismatic form, having a width (parallel to the planes of the electrodes) significantly greater than their height (perpendicular to these planes). This prismatic shape of the capsules 104 is deliberate. If the capsules 104 were essentially spherical, in the magenta state shown in FIG. 1B, the particles 108 would tend to gather in the highest part of the capsule, in a limited area centered directly above the center of the capsule. The color seen by the observer would then be essentially the average of this central magenta area and a white annulus surrounding this central area, where the white liquid 106 would be visible. Thus, even in this supposedly magenta state, the observer would see a pinkish color rather than a pure magenta, and the contrast between the two extreme optical states of the pixel would be correspondingly limited. In contrast, with the prismatic form of microcapsule shown in FIGS. 1A and 1B, the particles 108 cover essentially the entire cross-section of the capsule so that no, or at least very little white liquid is visible, and the contrast between the extreme optical states of the capsule is enhanced. For further discussion on this point, and on the desirability of achieving close-packing of the capsules within the electrophoretic layer, the reader is referred to the aforementioned U.S. Pat. No. 6,067,185, and the corresponding published International Application WO 99/10767. Also, as described in the aforementioned E Ink and MIT patents and applications, to provide mechanical integrity to the electrophoretic medium, the microcapsules are normally embedded within a solid binder, but this binder is omitted from FIGS. 1A, 1B, 2A, and 2B for ease of illustration.

A second electrophoretic display (generally designated 200) of the invention shown in FIGS. 2A and 2B comprises an encapsulated electrophoretic medium (generally designated 202) comprising a plurality of capsules 204, each of which contains a suspending liquid 206 and dispersed therein a plurality of negatively charged magenta particles 108 identical discussed to those in the first display 100 discussed above. The display 200 further comprises a front electrode 110, rear electrodes 112, and a substrate 114, all of which are identical to the corresponding integers in the first display 100. However, in addition to the magenta particles 108, there are suspended in the liquid 206 a plurality of positively charged, particles 218, which for present purposes will be assumed to be white.

Typically the liquid 206 is uncolored (i.e., essentially transparent), although some color may be present therein to adjust the optical properties of the various states of the display. FIG. 2A shows the display 200 with the front electrode 110 negatively charged relative to the rear electrode 112 of the illustrated pixel. The negatively charged particles 108 are held electrostatically adjacent the rear electrode 112, while the positively charged particles 218 are held electrostatically against the front electrode 110. Accordingly, an observer viewing the display 200 through the front electrode 110 sees a white pixel, since the white particles 218 are visible and hide the magenta particles 108.

FIG. 2B shows the display 200 with the front electrode 110 positively charged relative to the rear electrode 112 of the illustrated pixel. FIG. 2B additionally includes a mask 120 as in FIG. 1B. As in the corresponding optical state shown in FIG. 1B, the electrical potential between the electrodes is insufficient for negatively charged particles 108 to move to the positive front electrode 110, except for the portion of particles 109 that are exposed to light 140. At the same time, the electrical potential between the electrodes is insufficient for positively charged particles 218 to move to the negative rear electrode 112, with the exception of a portion of positively charged particles 219 that have been exposed to the light 140 and undergone a photoreaction. Thus, when the mask 120 is removed from the display 200 of FIG. 2B, there will be an outline of the mask in the positive (white) particles 218. See FIGS. 3A-3C.

Importantly, displays of the invention are reversible in that the pigment(s) can be driven back to their original states (see FIGS. 1A and 2A) with the application of suitable voltages between the front 110 and back 112 electrodes. Unlike prior art photoelectrophoretic systems, the photoelectrophoretic pigments are protected against oxidation/reduction at the electrodes by the capsule 104 wall. The capsule may be formed from a gelatin coacervate, or the capsule may be a seal microcell of an array of microcells that are sealed from the electrode, e.g., as described in the Background. Because the pigments are insulated against electrochemistry with electrodes, the pigments are not prone to break down or to become stuck to the electrodes. In such an encapsulated system, the photoreactions are predominantly transfer of photo-excitons in the pigment core to the surrounding medium and other particles. Such transfers are almost entirely reversible, thereby allowing a display to be addressed and rewritten multiple times. Displays of the present invention can, in this way, reproduce the appearance of high quality color printing, be erased, and used again.

Figure 3B:
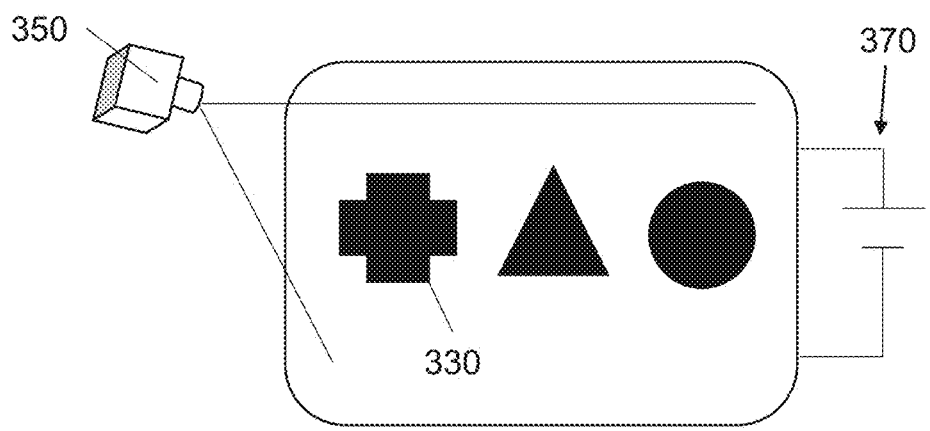
FIG. 3B illustrates an encapsulated photoelectrophoretic display being illuminated while three masks are covering portions of the active surface of the display. At the same time that the encapsulated photoelectrophoretic display is illuminated, an electric field is applied to photoelectrophoretic display medium.
Figure 3C:
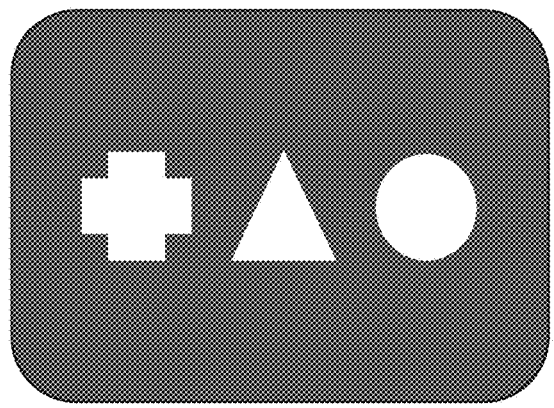
FIG. 3C shows the final results of the steps shown in FIG. 3B after the masks have been removed.

A method for creating a reflective image with a display of the type shown in FIGS. 1A-2B is illustrated in FIGS. 3A-3C. A display 300 comprising two types of photoelectrophoretic particles (similar to FIGS. 2A and 2B) is shown in FIG. 3A. The display 300 has an active surface 310 adjacent to, or equivalent to, the top electrode 110, and starts in a first state (all white). A mask 330, or some other patterned opaque material, is placed on the active surface 310, after which the active surface 310 and mask 330 are illuminated with light from a light source 350, as shown in FIG. 3B. The light source 350 may be, for example, sunlight, an incandescent filament, a fluorescent bulb, a light-emitting diode (LED), a laser, or some other source of light, or a combination of light sources. At the same time that the active surface 310 is illuminated, an electrical potential 370 is applied between the electrodes 110 and 112. However, the electrical potential 370 (alone) is insufficient to cause the pigment to migrate to the opposite electrode. As described above with respect to FIGS. 1B and 2B, only the areas that are exposed to the light in the presence of the electrical potential will switch, thereby leaving a pattern of the mask in the active surface after the mask is removed. Because the resulting display is bistable (e.g., stable for hours, days, weeks, months, or years), the invention provides a simple, low-cost way to display information, such as on a sign, poster, or billboard.

Figure 4A:
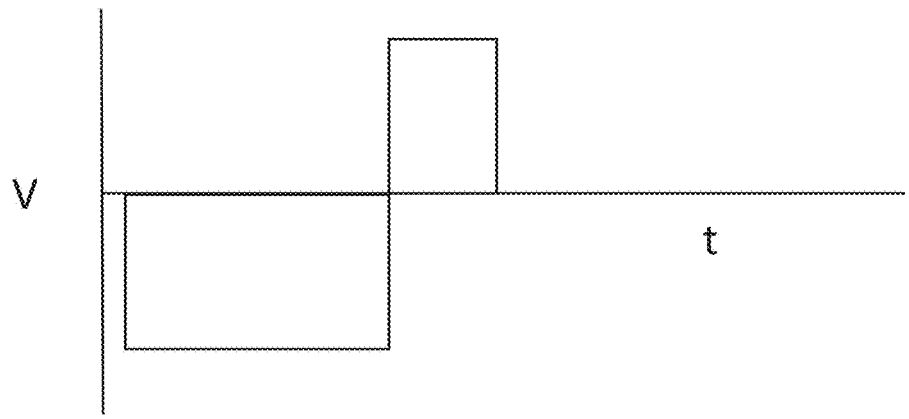
FIG. 4A shows a driving waveform for addressing an encapsulated photoelectrophoretic display with an illumination source.
Figure 4B:
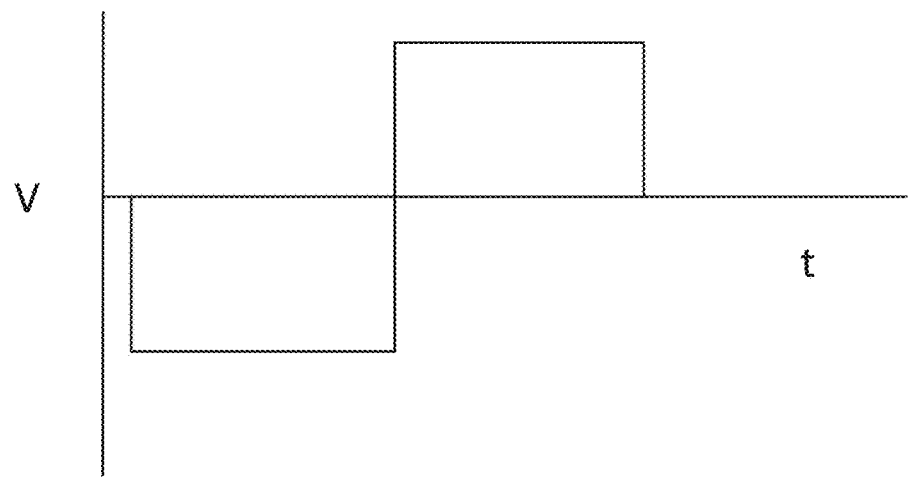
FIG. 4B shows a driving waveform for clearing an encapsulated photoelectrophoretic display that was addressed with an illumination source.

The electrical potentials used to address and rewrite the displays of the invention are typically voltage waveforms with well-defined amplitudes and durations, as shown in FIGS. 4A and 4B. As shown in FIG. 4A, an electrode (e.g., the front electrode of FIGS. 1A and 1B) may receive a negative full-width pulse that causes the photoelectrophoretic particles to move to the back electrode, after which the electrode receives a partial-width positive pulse at the same time that a portion of the display is being exposed to light. Because of the difference in the electrophoretic mobility in the particles exposed to the light, the partial-width pulse is sufficient to drive the photoactivated particles to the front electrode. After "writing" the display with a waveform of FIG. 4A, the entire display can be "erased" by applying a waveform similar to FIG. 4B, i.e., including full-width negative and full-width positive pulses. Using the waveform of FIG. 4B, substantially all of the photoelectrophoretic particles are driven to the back electrode and then to the front electrode, regardless of their electrophoretic mobility. In some embodiments, the full-width positive pulse will be sufficient to restore the photoelectrophoretic particle to their initial state, e.g., prior to exposure to light. In other embodiments, additional positive or negative pulses can be applied to refresh the particles.

The materials and processes used in preparing the media and displays of the present invention are generally similar to those used in similar prior art media and displays. As described for example in commonly-assigned U.S. Pat. No. 6,822,782, a typical electrophoretic medium comprises a fluid, a plurality of electrophoretic particles disposed in the fluid and capable of moving through the fluid (i.e., translating, and not simply rotating) upon application of an electric field to the fluid. The fluid also typically contains at least one charge control agent (CCA), a charging adjuvant, and a polymeric rheology modifier. These various components will now be described separately.

Photoelectrophoretic displays of the invention are not limited to two colors, or to two "full" colors however. For example, the initial "write" state might be a gray level between, e.g., white and magenta. Furthermore, pixels receiving light exposure during the write phase may be driven to an intermediate (pink) level, rather than white, by decreasing the voltage between the electrodes, 110 and 112, or by modifying the displayed image to intentionally decrease the light intensity of the projected image. In other embodiments, a "finish" voltage waveform may be used to adjust the state of the photoelectrophoretic medium 14 after an image has been written. A finish waveform may, for example, drive the entire photoelectrophoretic medium more toward the white or the magenta state, depending upon the needs of the final image. Additionally, a photoelectrophoretic display comprising multiple different colored photoelectrophoretic particles is possible. For example, a photoelectrophoretic display may be constructed comprising white, magenta, yellow, and cyan, particles. Such displays may comprise differing pixels with differing encapsulated photoelectrophoretic particles, e.g., capsules containing white and magenta, white and yellow, and white and cyan. Alternatively, such displays may comprise a plurality of capsules each containing multiple different photoelectrophoretic particles, for example a capsule including white, magenta, yellow, and cyan photoelectrophoretic particles. Of course, such a capsule will likely also behave differently depending upon the spectrum of the light used to cause photoelectrophoresis. That is, a display image written with red light will look different than a display image written with blue light.

A: Fluid

The fluid contains the charged photoelectrophoretic particles, which move through the fluid under the influence of an electric field. A preferred suspending fluid has a low dielectric constant (about 2), high volume resistivity (about $10^{15}$ Ohm·cm), low viscosity (less than 5 mPas), low toxicity and environmental impact, low water solubility (less than 10 parts per million (ppm), if traditional aqueous methods of encapsulation are to be used; note however that this requirement may be relaxed for non-encapsulated or certain microcell displays), a high boiling point (greater than about 90° C.), and a low refractive index (less than 1.5). The last requirement arises from the use of scattering (typically white) pigments of high refractive index, whose scattering efficiency depends upon a mismatch in refractive index between the particles and the fluid.

Organic solvents such as saturated linear or branched hydrocarbons, silicone oils, halogenated organic solvents, and low molecular weight halogen-containing polymers are some useful fluids. The fluid may comprise a single component or may be a blend of more than one component in order to tune its chemical and physical properties. Reactants or solvents for the microencapsulation process (if used), such as oil soluble monomers, can also be contained in the fluid.

Useful organic fluids include, but are not limited to, saturated or unsaturated hydrocarbons (such as, but are not limited to, dodecane, tetradecane, the aliphatic hydrocarbons in the ISOPAR® series (Exxon, Houston, Tex.), NORPAR® (Exxon; a series of normal paraffinic liquids), SHELL-SOL® (Shell, Houston, Tex.), and SOL-TROL® (Shell), naphtha, and other petroleum solvents; silicone oils (such as, but are not limited to, octamethyl cyclosiloxane and higher molecular weight cyclic siloxanes, poly(methyl phenyl siloxane), hexamethyldisiloxane, and polydimethylsiloxane; vinyl ethers, such as cyclohexyl vinyl ether and DECAVE® (International Flavors & Fragrances, Inc., New York, N.Y.); aromatic hydrocarbons, such as toluene; and halogenated materials including, but not limited to, tetrafluorodibromoethylene, tetrachloroethylene, trifluorochloroethylene, 1,2,4-trichlorobenzene and carbon tetrachloride and perfluoro- or partially-fluorinated hydrocarbons.

In some embodiments, the photoelectrophoretic fluid may contain an optically absorbing dye. This dye must be soluble or dispersible in the fluid, but will generally be insoluble in the other components of the microcapsule. There is much flexibility in the choice of dye material. The dye can be a pure compound, or blends of dyes may be used to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the bounding shell.

Many dyes can be used in photoelectrophoretic media. Important dye properties include light fastness, solubility or dispersibility in the fluid, color, and cost. The dyes are generally chosen from the classes of azo, azomethine, fluoran, anthraquinone, and triphenylmethane dyes and may be chemically modified so as to increase their solubility in the fluid and reduce their adsorption to the particle surfaces.

B: Photoelectrophoretic Particles

The photoelectrophoretic particles used in the media and displays of the present invention are preferably white, black, yellow, magenta, cyan, red, green, or blue in color, although other (spot) colors may also be used. There is much flexibility in the choice of such particles. For purposes of this invention, a photoelectrophoretic particle is any particle that is insoluble in the fluid and charged or capable of acquiring a charge (i.e., has or is capable of acquiring electrophoretic mobility), that undergoes a light-induced transformation that alters its electrophoretic mobility. In some cases, this mobility may be zero or close to zero (i.e., the particles will not move). The particles may be, for example, non-derivatized pigments or dyed (laked) pigments, or any other component that is charged or capable of acquiring a charge. Typical considerations for the photoelectrophoretic particle are its optical properties, photo-reactivity, electrical properties, surface chemistry, and reversibility. Photoelectrophoretic particles may include monoazo pigments, diazo pigments, azo methine pigments, anthraquinone pigments, quinophtharone pigments, quinacridone pigments, benzimidazolone pigments, isoindoline pigments, phthalocyanine pigments, or perynone pigments The photoelectrophoretic particles may have any shape, i.e., spherical, plate-like or acicular. A display may also include scattering particles. A scattering particle typically has high refractive index, high scattering coefficient, and low absorption coefficient and may be composed of an inorganic material such as rutile (titania), anatase (titania), barium sulfate, zirconium oxide, kaolin, or zinc oxide. A reflective material can also be employed, such as a metallic particle. Useful particle diameters may range from 10 nm up to about 10 μm, although for light-scattering particles it is preferred that the particle diameter not be smaller than about 200 nm.

Useful raw pigments for use in the photoelectrophoretic particles include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Black, CBS (E. I. du Pont de Nemours and Company, Inc., Wilmington, Del., hereinafter abbreviated du Pont), Crocein Scarlet N Ex (du Pont) (27290), Fiber Black VF (du Pont) (30235), Luxol Fast Black L (du Pont) (Solv. Black 17), Nirosine Base No. 424 (du Pont) (50415 B), Oil Black BG (du Pont) (Solv. Black 16), Rotalin Black RM (du Pont), Sevron Brilliant Red 3 B (du Pont); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (GAF) (Basic Black 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Black 4); Sulphone Cyanine Black BA-CF (GAF) (26370), Zambezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 μm), Statex B-12 (Columbian Carbon Co.) (a furnace black of 33 μm average particle size), Greens 223 and 425 (The Shepherd Color Company, Cincinnati, Ohio 45246); Blacks 1, 1G and 430 (Shepherd); Yellow 14 (Shepherd); Krolor Yellow KO-788-D (Dominion Colour Corporation, North York, Ontario; KROLOR is a Registered Trade Mark); Red Synthetic 930 and 944 (Alabama Pigments Co., Green Pond, Ala. 35074), Krolor Oranges KO-786-D and KO-906-D (Dominion Colour Corporation); Green GX (Bayer); Green 56 (Bayer); Light Blue ZR (Bayer); Fast Black 100 (Bayer); Bayferrox 130M (Bayer BAYFERROX is a Registered Trade Mark); Black 444 (Shepherd); Light Blue 100 (Bayer); Light Blue 46 (Bayer); Yellow 6000 (First Color Co., Ltd., 1236-1, Jungwang-dong, Siheung-city, Kyonggi-do, Korea 429-450), Blues 214 and 385 (Shepherd); Violet 92 (Shepherd); and chrome green.

The photoelectrophoretic particles may also include laked, or dyed, pigments. Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (C1 Pigment Blue 24) and Persian orange (lake of C1 Acid Orange 7), Black M Toner (GAF) (a mixture of carbon black and black dye precipitated on a lake).

It is preferred that pigments in the three subtractive primary colors (yellow, magenta and cyan) have high extinction coefficients and sufficiently small particle size as to be substantially non scattering of incident light.

Particularly preferred raw pigment particles of the present invention are the black spinels described in U.S. Pat. No. 8,270,064; titania, preferably with a silica, alumina or zirconia coating; red: Pigment Red 112, Pigment Red 179, Pigment Red 188 and Pigment Red 254; green: Pigment Green 7; Blue: Pigment Violet 23; yellow: Pigment Yellow 74, Pigment Yellow 120, Pigment Yellow 138, Pigment Yellow 139, Pigment Yellow 151, Pigment Yellow 155, and Pigment Yellow 180; magenta: Pigment Violet 19, Pigment Red 52:2 and Pigment Red 122; cyan: Pigment Blue 15:2, Pigment Blue 15:3, Pigment Blue 15:4 and Pigment Blue 15:6.

Additional pigment properties which may be relevant are particle size distribution and light-fastness. Composite particle (i.e., polymeric particles that incorporate smaller pigment particles or dyes) may be used in the present invention. Pigments may be surface-functionalized as described below or may be used without functionalization.

The physical properties and surface characteristics of photoelectrophoretic particles can be modified by adsorbing various materials on to the surfaces of the particles, or chemically bonding various materials to these surfaces; see U.S. Pat. No. 6,822,782, especially column 4, line 27 to column 5, line 32. This same U.S. patent demonstrates that there is an optimum amount of polymer which should be deposited (too large a proportion of polymer in the modified particle causes an undesirable reduction in the electrophoretic mobility of a particle) and that the structure of the polymer used to form the coating on the particle is important.

C: Charge Control Agents

The photoelectrophoretic media of the present invention will typically contain a charge control agent (CCA), and may contain a charge director. These photoelectrophoretic media components typically comprise low molecular weight surfactants, polymeric agents, or blends of one or more components and serve to stabilize or otherwise modify the sign and/or magnitude of the charge on the electrophoretic particles. The CCA is typically a molecule comprising ionic or other polar groupings, hereinafter referred to as head groups. At least one of the positive or negative ionic head groups is preferably attached to a non-polar chain (typically a hydrocarbon chain) that is hereinafter referred to as a tail group. It is thought that the CCA forms reverse micelles in the internal phase and that it is a small population of charged reverse micelles that leads to electrical conductivity in the very non-polar fluids typically used as electrophoretic fluids.

Reverse micelles comprise a highly polar core (that typically contains water) that may vary in size from 1 nm to tens of nanometers (and may have spherical, cylindrical, or other geometry) surrounded by the non-polar tail groups of the CCA molecule. Reverse micelles have been extensively studied, especially in ternary mixtures such as oil/water/surfactant mixtures. An example is the iso-octane/water/AOT mixture described, for example, in Fayer et al., J. Chem. Phys., 131, 14704 (2009). In photoelectrophoretic media, three phases may typically be distinguished: a solid particle having a surface, a highly polar phase that is distributed in the form of extremely small droplets (reverse micelles), and a continuous phase that comprises the fluid. Both the charged particles and the charged reverse micelles may move through the fluid upon application of an electric field, and thus there are two parallel pathways for electrical conduction through the fluid (which typically has a vanishingly small electrical conductivity itself).

The polar core of the CCA is thought to affect the charge on surfaces by adsorption onto the surfaces. In a photoelectrophoretic display, such adsorption may be onto the surfaces of the photoelectrophoretic particles or the interior walls of a microcapsule (or other solid phase, such as the walls of a microcell) to form structures similar to reverse micelles, these structures hereinafter being referred to as hemi-micelles. When one ion of an ion pair is attached more strongly to the surface than the other (for example, by covalent bonding), ion exchange between hemi-micelles and unbound reverse micelles can lead to charge separation in which the more strongly bound ion remains associated with the particle and the less strongly bound ion becomes incorporated into the core of a free reverse micelle.

It is also possible that the ionic materials forming the head group of the CCA may induce ion-pair formation at the photoelectrophoretic particle (or other) surface. Thus the CCA may perform two basic functions: charge-generation at the surface and charge-separation from the surface. The charge-generation may result from an acid-base or an ion-exchange reaction between some moieties present in the CCA molecule or otherwise incorporated into the reverse micelle core or fluid, and the particle surface. Thus, useful CCA materials are those which are capable of participating in such a reaction, or any other charging reaction as known in the art. The CCA molecules may additionally act as receptors of the photo-excitons produced by the photoelectrophoretic particles when the particles are irradiated with light.

Non-limiting classes of charge control agents which are useful in the media of the present invention include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethylhexyl) sulfosuccinate, calcium dodecylbenzenesulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulfate. Useful metal soaps include, but are not limited to, basic or neutral barium petronate, calcium petronate, cobalt, calcium, copper, manganese, magnesium, nickel, zinc, aluminum and iron salts of carboxylic acids such as naphthenic, octanoic, oleic, palmitic, stearic, and myristic acids and the like. Useful block or comb copolymers include, but are not limited to, AB diblock copolymers of (A) polymers of 2-(N,N-dimethylamino)ethyl methacrylate quaternized with methyl p-toluenesulfonate and (B) poly(2-ethylhexyl methacrylate), and comb graft copolymers with oil soluble tails of poly(12-hydroxystearic acid) and having a molecular weight of about 1800, pendant on an oil-soluble anchor group of poly(methyl methacrylate-methacrylic acid). Useful organic amides/amines include, but are not limited to, polyisobutylene succinimides such as OLOA 371 or 1200 (available from Chevron Oronite Company LLC, Houston, Tex.), or Solsperse 17000 (available from Lubrizol, Wickliffe, Ohio: Solsperse is a Registered Trade Mark), and N-vinylpyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents. Useful tail groups for CCA include polymers of olefins such as poly (isobutylene) of molecular weight in the range of 200-10,000. The head groups may be sulfonic, phosphoric or carboxylic acids or amides, or alternatively amino groups such as primary, secondary, tertiary or quaternary ammonium groups.

Charge adjuvants used in the media of the present invention may bias the charge on photoelectrophoretic particle surfaces, as described in more detail below. Such charge adjuvants may be Bronsted or Lewis acids or bases.

Particle dispersion stabilizers may be added to prevent particle flocculation or attachment to the capsule or other walls or surfaces. For the typical high resistivity liquids used as fluids in photoelectrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

D: Polymeric Additives

As described in U.S. Pat. No. 7,170,670, the bistability of electrophoretic media can be improved by including in the fluid a polymer having a number average molecular weight in excess of about 20,000, this polymer being essentially non-absorbing on the electrophoretic particles; poly(isobutylene) is a preferred polymer for this purpose.

Also, as described in for example, U.S. Pat. No. 6,693,620, a particle with immobilized charge on its surface sets up an electrical double layer of opposite charge in a surrounding fluid. Ionic head groups of the CCA may be ion-paired with charged groups on the photoelectrophoretic particle surface, forming a layer of immobilized or partially immobilized charged species. Outside this layer is a diffuse layer comprising charged (reverse) micelles comprising CCA molecules in the fluid. In conventional DC electrophoresis an applied electric field exerts a force on the fixed surface charges and an opposite force on the mobile counter-charges, such that slippage occurs within the diffuse layer and the particle moves relative to the fluid. The electric potential at the slip plane is known as the zeta potential.

Other known photoconductive materials which may be useful in the present invention include hydrogenated amorphous silicon, cadmium selenide, gallium arsenide, trigonal selenium, amorphous selenium, doped amorphous selenium substances, halogen doped amorphous selenium substances, amorphous selenium alloys, doped amorphous selenium alloys, including selenium arsenic, selenium tellurium, selenium arsenic antimony, halogen doped selenium alloys, wherein the dopant is a material such as chlorine, iodine, bromine, sodium or fluorine, cadmium sulfide, an alkali metal, and the like. Selenium alloys that may be used may comprise, for example, selenium-tellurium-arsenic; in one embodiment a halogen doped selenium arsenic alloy is employed. Other inorganic photoconductive materials may include, for example, cadmium sulfoselenide, cadmium selenide, and cadmium sulfide. The organic photoconductive composition may include, for example, a metal free phthalocyanine, a metal phthalocyanine, a charge transfer complex material, a squarilium dye, and a vanadyl phthalocyanine. Generally, these photoconductive materials are deposited on a suitable substrate, such as a glass, plastic, or polyester substrate.

Figure 5A:
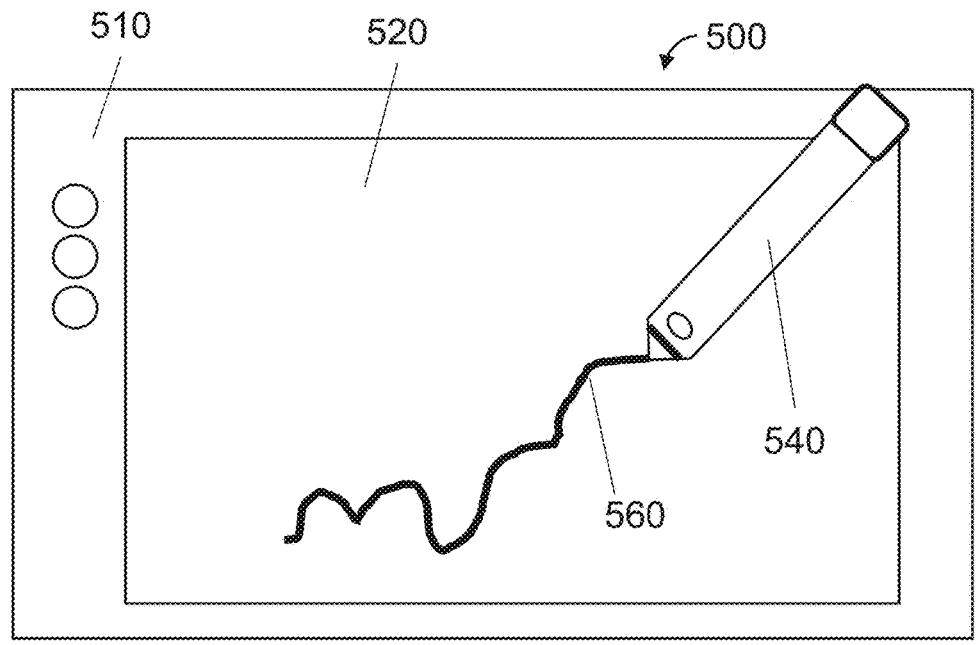
FIG. 5A shows a tablet including an encapsulated photoelectrophoretic display and a light pen that can address the tablet.
Figure 5B:
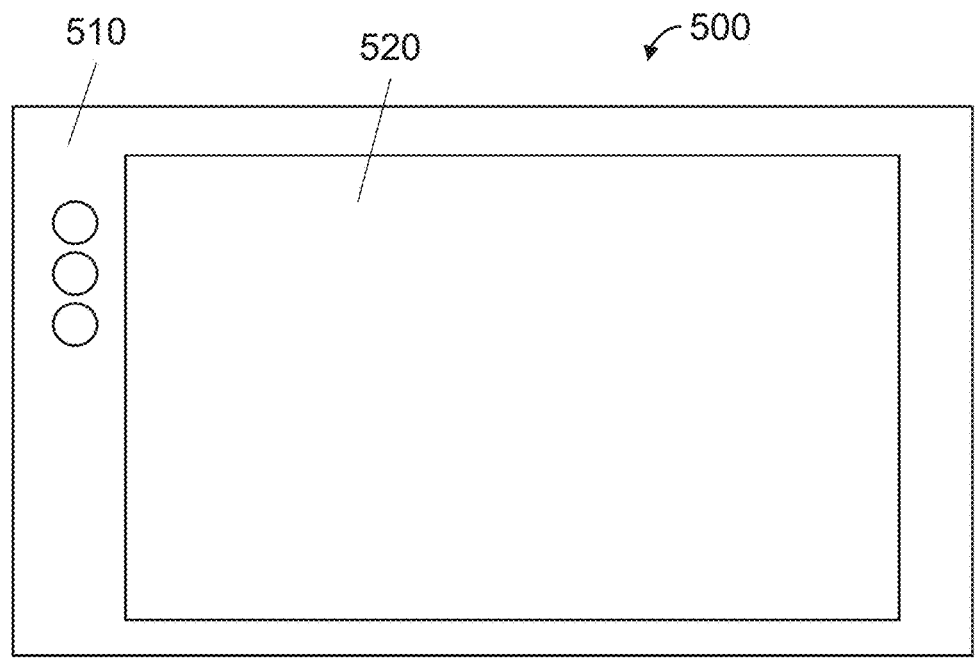
FIG. 5B shows the tablet after the encapsulated photoelectrophoretic medium has been cleared by providing a suitable voltage waveform.

Displays of the invention lend themselves to writing and/or drawing tablets 500 that are easily addressed with a light source, e.g., a light pen 540. An embodiment of such a tablet is shown in FIGS. 5A and 5B. The tablet 500 includes a body 510 that contains the various power supply, controllers, and electronics to provide the waveforms to the display 520 to provide a photoelectrophoretic response. When the light pen is on and a suitable electrical potential is provided, the light pen will create a line 560 of pigment switching on the display. The body 510 may also include a processor and memory as needed to control the electrodes. The tablet can include one or more switches or buttons to erase the design placed on the tablet. See FIG. 5B. The tablet 500 may include a single back electrode of the type shown in FIGS. 1A-2B, or the tablet 500 may include an active matrix, thereby allowing the display of pre-patterned pix-elated images, upon which the light pen 540 can draw. In some embodiments the tablet 500 will additionally include an array of photosensors so that it is possible to record the design drawn on the display 520 with the light pen 540. In some embodiments, the tablet 500 will include network and/or WIFI and/or wireless capabilities. A larger format display medium can be used to create light-pen addressable signage, for example a menu board found at a coffee shop.

Figure 6A:
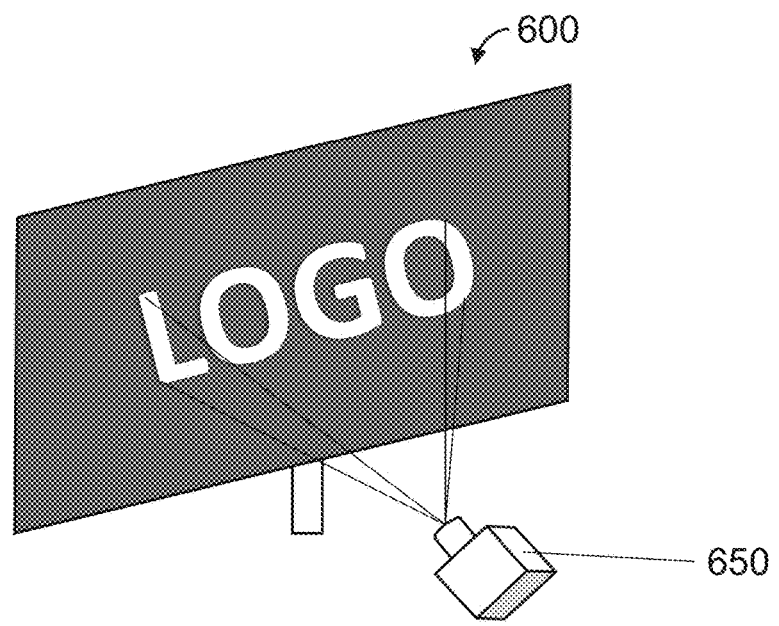
FIG. 6A illustrates a billboard including an encapsulated photoelectrophoretic display, and illumination (writing) with a patterned source of light.
Figure 6B:
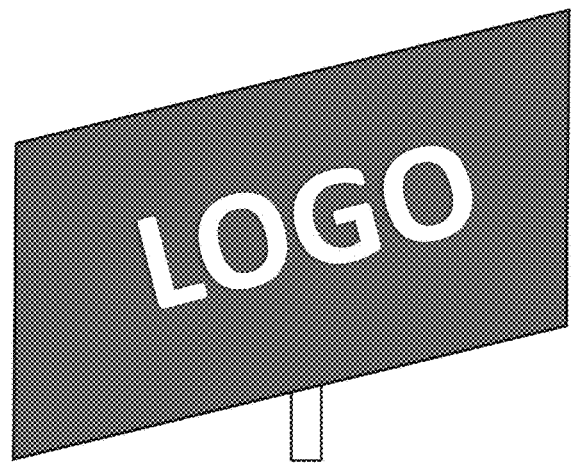
FIG. 6B illustrates the billboard of 6A after illumination. The billboard will retain the image independently, without requiring additional power.
Figure 7A:
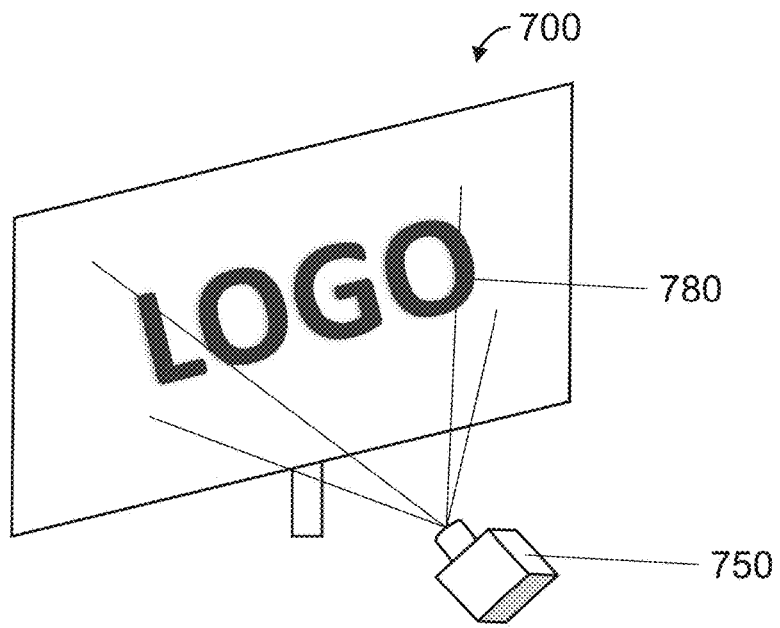
FIG. 7A illustrates a billboard including an encapsulated photoelectrophoretic display, and illumination (writing) with a source of light. A mask has been placed on the active surface of the display, resulting in a pattern being imprinted on the display (see FIG. 7B).
Figure 7B:
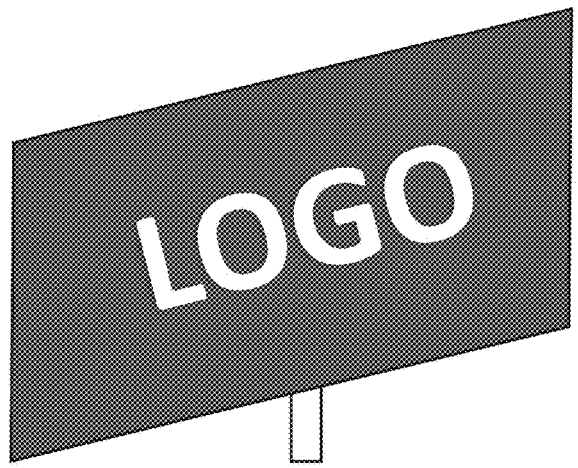
FIG. 7B illustrates the billboard of 7A after illumination. The billboard will retain the image independently, without requiring additional power.

Displays of the invention are also useful for large-format displays that will be changed regularly. For example, billboards 600/700, illustrated in FIGS. 6A, 6B, 7A, and 7B may be written repeatedly with differing content. When the content is to be changed, the display is merely "wiped" and rewritten. If a stable photoelectrophoretic medium is used, the written image will be displayed for some time, as shown in FIG. 6B. In some embodiments, the image will be stable for greater than 10 minutes, e.g., greater than 30 minutes, e.g., greater than one day, e.g., greater than one week, e.g., greater than two weeks, e.g., greater than one month, e.g., greater than six months, e.g., greater than one year. For outdoor applications, such as shown in FIGS. 6A and 6B, it may be beneficial to write an image to the display using patterned light during the night, so that incident sunlight will not interfere with the writing process. In alternate embodiments, where it is possible to place a mask 780 or stencil over the display surface, the display 700 can be addressed as described with respect to FIG. 3.

Figure 8:
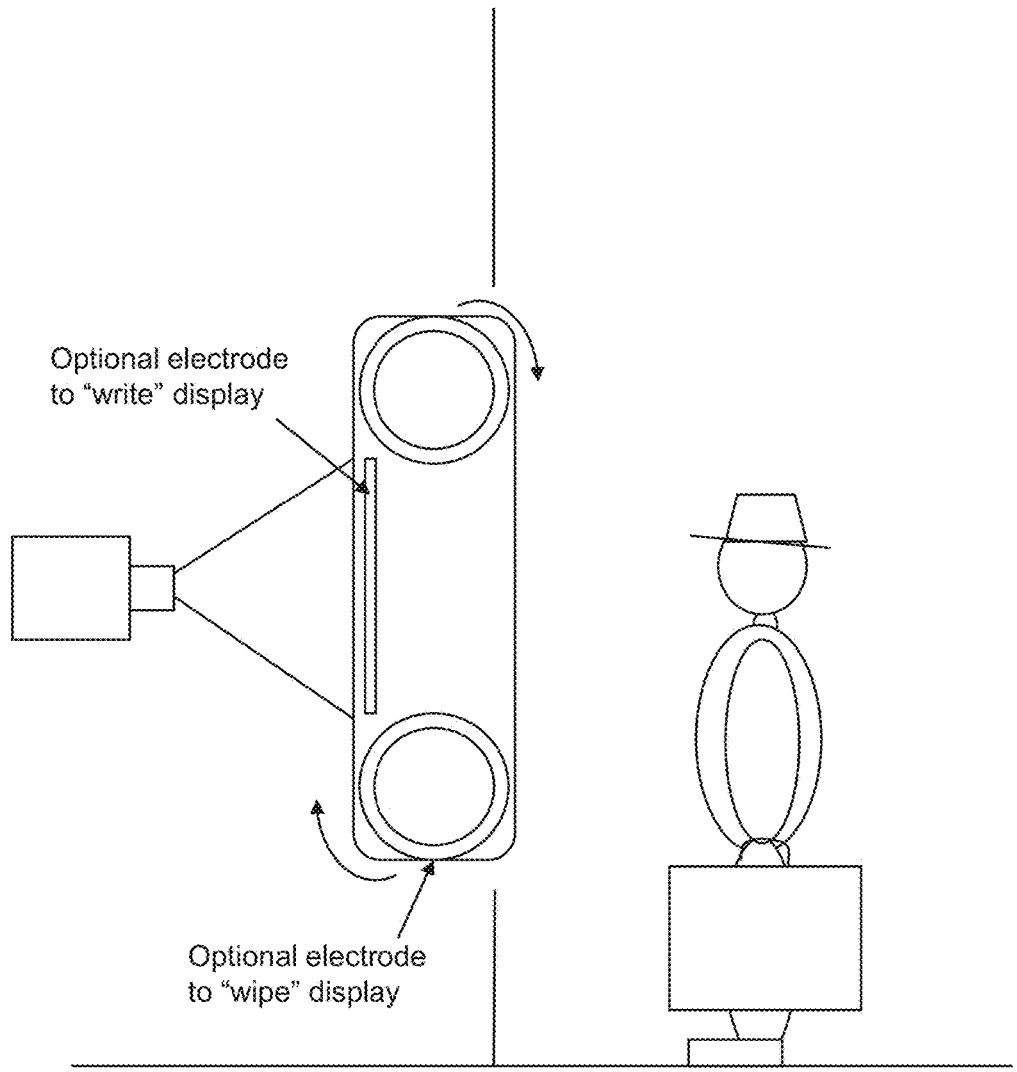
FIG. 8 illustrates the use of a display of the invention for rolling loop signage. Signage of the invention can be used, for example, to direct travelers to destinations or events. Such displays can be rewritten many times, however they require far less power to display the information when compared to LCD or LED displays.
Figure 10:
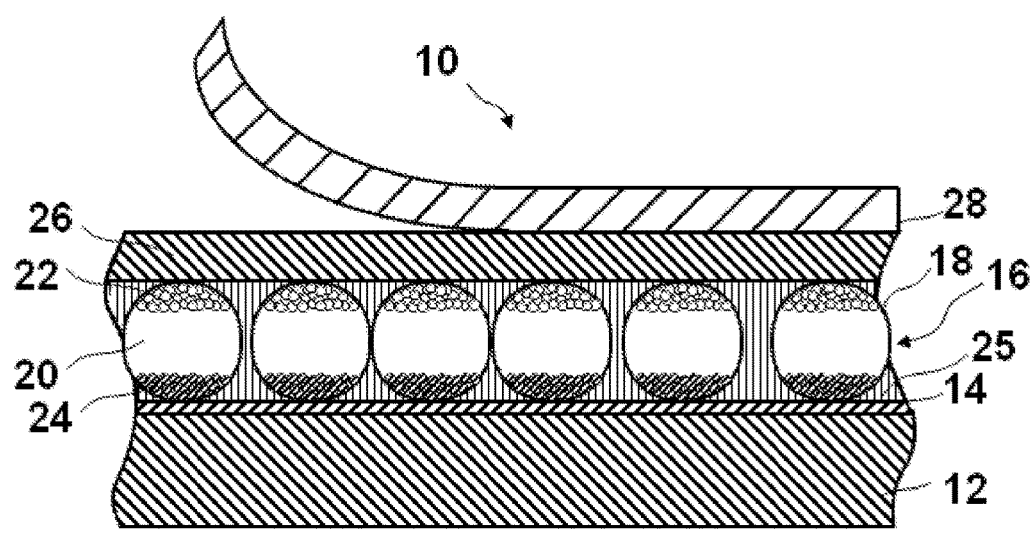
FIG. 10 is a reproduction of FIG. 1 of U.S. Pat. No. 6,982,178.

Advanced applications of the displays of the invention can be used in other environments where temporary or personalized information is needed in a large format. In the embodiment shown in FIG. 8, a flexible display of the invention is arranged on rollers, allowing the display to be shown on one side of a wall and written on another side of the wall. By carefully controlling the electrical potential between the times of writing and erasing, the same display medium can be used again and again to provide up-to-date and/or varied information in a large format. For example, as shown in FIG. 8 a looped display could be used to provide information to a traveler regarding transportation options from an airport. Unlike conventional LCD displays, however, the looped display shown in FIG. 8 would only have to be updated when needed, e.g., because of schedule changes, and would not require constant power input. Such displays would greatly reduce the amount of energy required to provide up-to-date information. While the looped display of FIG. 8 is shown with separate electrodes to wipe and write the display, the looped display may simply comprise looped material of the type shown in FIGS. 1A-2B, and be wiped and written as described with respect to FIGS. 6A and 6B.

The displays 100/200 of the invention may be part of a display system. For example, the display system may include a display of the type described in FIGS. 1A-2B as well as a voltage supply and a controller for regulating how and when an electrical potential is presented to electrodes 110 and 112. The display system may additionally include an illumination source.

Hybrid systems incorporating the principles of the invention are also possible, as illustrated in FIGS. 9A-9C. The display medium in FIGS. 9A-9C, may be used, for example for a billboard in direct sunlight. Unlike the displays 100/200 of FIGS. 1A-2B, the hybrid display 900 does not include a rear electrode. Rather, the electrical potentials needed to wipe and write the display medium are provided by the wipe electrodes 930 and the write electrodes 940. The hybrid display 900 is based upon a layered photoelectrophoretic medium 910 that includes a transparent electrode and an encapsulate photoelectrophoretic medium. Because the write electrode 940 is coupled with an illumination source 950, some portion of the hybrid display 900 can be written with the illumination source 950, as desired. That is, the hybrid display 900 could show an image on the front (FIG. 9C) while the rear (FIG. 9B) of the hybrid display 900 is wiped and re-written. In some embodiments, the hybrid display 900 may incorporate multiple transparent electrodes for ease of addressing the photoelectrophoretic medium. In some embodiments, the wipe and write electrodes 930 and 940 will move across the layered medium 910. In other embodiments, the layered medium will be scrolled across wipe and write electrodes 930 and 940. Because there is insufficient electrical potential to write the hybrid display 900 on the front side (FIG. 9C), the state of the photoelectrophoretic medium will not be altered by the ambient light. In alternative embodiments, the composition of the photoelectrophoretic particles inside display 900 can only be written with non-visible light, e.g., UV light. In such embodiments, the hybrid display 900 may also include a filter 960, such as a UV filter, to protect the front of the display from other incident light that may affect the state of the photoelectrophoretic medium. Such hybrid displays 900 are thus able to display images, etc., in direct sunlight, yet the content shown on the front of the display can be updated regularly.

While displays of the invention are intended to display images for long periods of time with little to no energy input, the looped displays, described above, can be used to refresh content on the same time scale as emissive displays, e.g., large format LED displays. Displays of the invention can display two different images in less than one hour, e.g., in less than 10 minutes, e.g., in less than five minutes, e.g., in less than two minutes. Furthermore, the refresh periods can be staggered, depending upon the use of the display. For example, a transportation schedule may be refreshed every five minutes with an advertisement that lasts for 30 seconds, whereupon the transportation schedule is returned for another five minute period.

From the foregoing, it will be seen that the present invention can provide a reusable large-format display medium that requires little energy to maintain an image. Additionally, because the displays of the invention are lightweight and flexible, they can be used in a variety of temporary environments, i.e., they can be disassembled, moved, etc. with ease. In some embodiments, the displays may be simply rolled up like a poster and carted away. Finally, because digital photography and graphic arts are ubiquitous, there is no barrier to using the displays of the invention outside of providing a suitable illumination device coupled to a computer, for example an LCD or LED projector.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method for creating a reflective image, comprising: providing a display including, in order,
  a transparent electrode,
  an encapsulated photoelectrophoretic medium layer comprising a plurality of gelatin coacervate capsules held by a polymeric binder, wherein the gelatin coacervate capsules contain a plurality of reflective photoelectrophoretic particles in an organic solvent, and
  a rear electrode;
  supplying a first electrical potential between the transparent electrode and the rear electrode; and
  exposing the display to a source of patterned light.

2. The method of claim 1, further comprising supplying a second electrical potential to remove the reflective image.

3. The method of claim 1, wherein the source of patterned light comprises a laser.

4. The method of claim 1, wherein the source of patterned light comprises a light-emitting diode, a fluorescent light, or an incandescent filament.

5. The method of claim 1, wherein the source of patterned light comprises a mask.

6. The method of claim 1, wherein the first electrical potential is a time-dependent wave form.

7. The method of claim 1, wherein the photoelectrophoretic medium comprises monoazo pigments, diazo pigments, azo methine pigments, anthraquinone pigments, quinophtharone pigments, quinacridone pigments, benzimidazolone pigments, isoindoline pigments, phthalocyanine pigments, or perynone pigments.

8. A system for providing a reflective image with a pattern, comprising:
  a display including, in order,
    a transparent electrode,
    an encapsulated photoelectrophoretic medium layer comprising a plurality of gelatin coacervate capsules held by a polymeric binder, wherein the gelatin coacervate capsules contain a plurality of reflective photoelectrophoretic particles in an organic solvent, and
    a rear electrode;
  a voltage supply for providing an electrical potential between the transparent electrode and the rear electrode; and
  an illumination source configured to illuminate a portion of the display with light to address the display.

9. The system of claim 8, further comprising a controller for regulating the electrical potential.

10. The system of claim 8, wherein the illumination source is an array of light sources.

11. The system of claim 8, wherein the illumination source comprises a light-emitting diode, an incandescent filament, or a laser.

12. The system of claim 8, wherein the illumination source produces light outside of the visible spectrum.

* * * * *